(12) United States Patent
Whitney et al.

(10) Patent No.: US 8,483,935 B2
(45) Date of Patent: Jul. 9, 2013

(54) METHOD FOR CONTROLLING INTERNAL COMBUSTION ENGINES IN HYBRID POWERTRAINS

(75) Inventors: Christopher E. Whitney, Commerce, MI (US); William R. Cawthorne, Milford, MI (US); Anthony H. Heap, Ann Arbor, MI (US); Jeffrey M. Kaiser, Highland, MI (US); Dennis A. Light, Monroe, MI (US); Jon C. Wasberg, Davison, MI (US); Weixin Yan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 495 days.

(21) Appl. No.: 12/878,380

(22) Filed: Sep. 9, 2010

(65) Prior Publication Data

US 2012/0065864 A1   Mar. 15, 2012

(51) Int. Cl.
  *F02D 28/00* (2006.01)
  *B60W 20/00* (2006.01)
  *G06F 17/00* (2006.01)
(52) U.S. Cl.
  USPC .................. 701/103; 701/85; 180/65.285

(58) Field of Classification Search
  USPC ....... 701/103, 22, 102, 54, 84, 85; 180/65.28, 180/65.285; 477/5, 98, 83, 107
  See application file for complete search history.

(56) References Cited

U.S. PATENT DOCUMENTS

| | | | | |
|---|---|---|---|---|
| 6,364,807 B1 * | 4/2002 | Koneda et al. | ............. | 180/65.25 |
| 7,444,234 B2 * | 10/2008 | Bauerle | .................. | 701/114 |
| 8,079,933 B2 * | 12/2011 | Kaminsky et al. | ............. | 477/5 |
| 8,364,373 B2 * | 1/2013 | Whitney et al. | ............. | 701/85 |

* cited by examiner

*Primary Examiner* — Hieu T Vo
(74) *Attorney, Agent, or Firm* — Quinn Law Group, PLLC

(57) ABSTRACT

A method for selectively creating vacuum in a hybrid powertrain controlled by a hybrid control processor and having an engine controlled by an engine control module includes requesting a pressure differential between a first intake point and a second intake point, wherein the first intake point and the second intake point are separated by a throttle. An actual torque capacity is calculated for the engine, wherein the actual torque capacity occurs when pressure is substantially equal at the first intake point and at the second intake point. A desired torque capacity is also calculated for the engine, wherein the desired torque capacity reduces the pressure at the second intake point relative to the pressure at the first intake point, such that the requested pressure differential is created. The engine is then operated at one of the desired torque capacity and the actual torque capacity.

11 Claims, 2 Drawing Sheets

METHOD FOR CONTROLLING INTERNAL COMBUSTION ENGINES IN HYBRID POWERTRAINS

TECHNICAL FIELD

This disclosure relates to methods for estimating and controlling torque and vacuum in internal combustion engines of hybrid vehicles.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power the vehicle systems. The HEV generally employs one or more electric machines (motor/generators) that operate individually or in concert with the internal combustion engine to propel the vehicle. The electric machines convert kinetic energy into electrical energy which may be stored in an energy storage device. The electrical energy from the energy storage device may also be converted back into kinetic energy for propulsion of the vehicle.

SUMMARY

A method for selectively creating vacuum in a hybrid powertrain controlled by a hybrid control processor and having an engine controlled by an engine control module is provided. The method includes requesting a pressure differential between a first intake point and a second intake point, wherein the first intake point and the second intake point are separated by a throttle. An actual torque capacity is calculated for the engine, wherein the actual torque capacity occurs when pressure is substantially equal at the first intake point and at the second intake point. A desired torque capacity is also calculated for the engine, wherein the desired torque capacity reduces the pressure at the second intake point relative to the pressure at the first intake point, such that the requested pressure differential is created. The engine is then operated at one of the desired torque capacity and the actual torque capacity.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
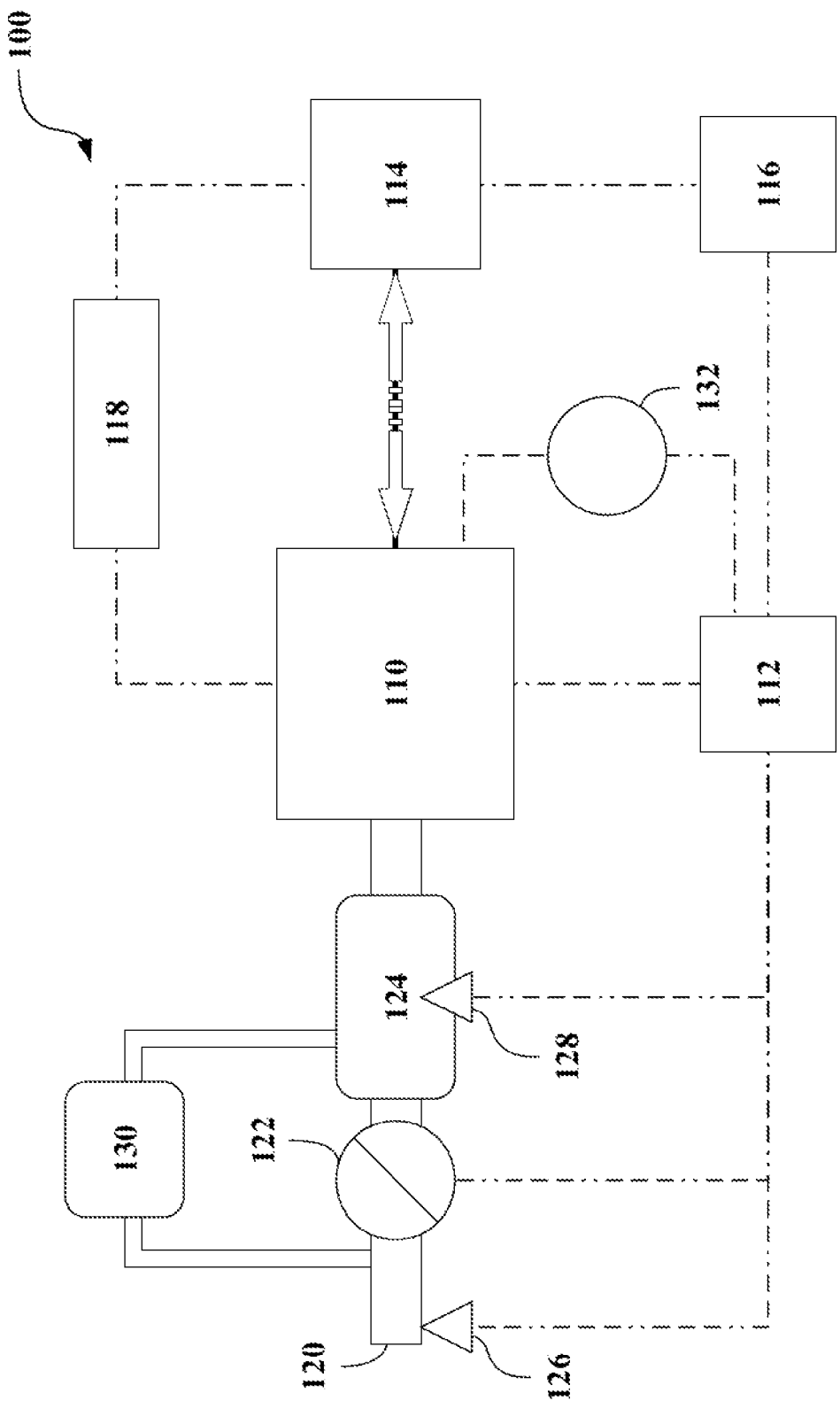
FIG. 1 is a schematic diagram of a hybrid powertrain.

Referring to the drawings, wherein like reference numbers correspond to like or similar components throughout the several figures, there is shown in FIG. 1 a schematic diagram of a hybrid powertrain 100 for a hybrid vehicle. The hybrid powertrain 100 includes an internal combustion engine 110, which is controlled by an engine control module 112 (or ECM 112), and an electric machine 114, which is controlled by a hybrid control processor 116 (or HCP 116). The engine 110 and electric machine 114 are the primary movers for the hybrid vehicle and are in power-flow communication with each other and with a final drive (not shown) of the hybrid powertrain. The engine 110 and electric machine 114 combine to accelerate and decelerate the vehicle.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. As used herein, the term hybrid vehicle refers generally to any vehicle configured with multiple power sources (such as the engine 110 and one or more electric machines 114) which may include alternative energy traction devices or primary movers.

The electric machine 114 is configured to convert kinetic or mechanical energy into electrical energy or electric potential energy which may be stored in an energy storage device or battery 118. The electrical energy from the battery 118 may then be converted back into kinetic energy for propulsion of the hybrid vehicle. The electric machine 114 may convert kinetic energy from the engine 110 or may assist the engine 110 in providing propulsion for the hybrid powertrain 100. The electric machine 114 may be an electric motor, an electric generator, a motor/generator, or any combination or amalgamation thereof.

The engine 110 is in communication with an air intake 120. Selective amounts of air are allowed to pass through the air intake 120 via a throttle 122, which is controlled directly or indirectly by the ECM 112. A manifold 124 is disposed between the throttle 122 and the engine 110, and the throttle 122 selectively and variably allows air into the manifold 124.

By varying the amount of air entering the engine 110, the throttle varies the combustion process and varies the power and torque output of the engine 110. The air is combined with fuel (gasoline, diesel, biodiesel, natural gas, et cetera) in the engine 110. In very general terms, and with many other variables fixed or ignored, more air allows more fuel to be combusted and more torque to be produced by the engine 110. Opening the throttle to its widest and least restrictive position allows the engine 110 to operate at its highest torque output, its maximum capacity. This is referred to as saturating the throttle 122.

An intake sensor 126 is in communication with the air intake 120, and measures a throttle intake pressure or throttle intake air pressure (TIAP). The intake sensor 126 generally measures the pressure of the ambient air entering the air intake 120.

A manifold air pressure sensor or MAP sensor 128 measures pressure within the manifold 124. The throttle 122 varies pressure within the manifold 124 by selectively restricting air flow into the manifold 124 from the intake. The throttle intake air pressure may also be a learned value derived using the MAP sensor 128 when the engine is not spinning and the manifold and intake pressures become equalized.

When the throttle 122 is in its least restrictive (saturated airflow) position, the engine 110 is generally running at its maximum available torque capacity. However, when the throttle 122 is restricting airflow between the air intake 120 and the manifold 124, the engine 110 is running below maximum available torque capacity. Furthermore, when the throttle 122 is restricting airflow between the air intake 120 and the manifold 124, there is a vacuum or pressure differential between the between the air intake 120 and the manifold 124.

An air mass sensor (not shown) may also be used to measure airflow volume and mass passing through the air intake 120. The air mass sensor may be disposed in front of the throttle 122, or may be located elsewhere along the air intake 120.

A vacuum requester 130 is a schematic representation of numerous components or engine functions which may be found incorporated into the hybrid powertrain 100. The vacuum requester 130 is selectively in airflow communication with the air intake 120 and the manifold 124, such that the vacuum requester 130 may utilize the vacuum created between the air intake 120 and the manifold 124. For example, and without limitation, the vacuum requester 130 may be a canister purge process, an exhaust gas recirculation (EGR) system, a brake booster vacuum, an evaporative (EVAP) emissions systems, or a positive crank case ventilation system.

Depending upon the configuration of the hybrid powertrain 100, and the relative capabilities of the prime movers (the engine 110 and the electric machines 114), the hybrid powertrain 100 may be configured such that the engine 110 regularly runs at its actual maximum torque capacity. When running at the actual maximum torque capacity, the pressure at the air intake 120 and the manifold 124 is substantially equal, such that there is no vacuum available for the vacuum requester. Therefore, the hybrid powertrain 100 may spend a large percentage of time with the engine 110 running at maximum torque capacity, requiring unthrottled operation, and the vacuum requester 130 may not have readily available pressure differentials during normal operations.

The ECM 112 uses inputs from some or all of the sensors (intake sensor 126, MAP sensor 128, and air mass sensor) to estimate or calculate the torque capacity of the engine 110. The ECM 112 may send the determined torque capacity, and other measured or determined information, to the HCP 116 to be used in optimization. The HCP 116 determines the amount of torque the engine 110 should supply and how much torque (positive or negative) the electric machine 114 should supply to optimize operation of the hybrid powertrain 100. Generally, more accurate estimates of the torque capacity of the engine 110 allow more accurate optimization of the hybrid powertrain 100 by the HCP 116.

The ECM 112 effects the torque requested from the HCP 116 by controlling torque actuators. The throttle 122 is one of the torque actuators. Additional torque actuators are represented schematically at 132 in FIG. 1. The additional torque actuators 132 may include, without limitation: cam phasers and the EGR system, which affect dilution of the combustion process; spark and spark timing; variable displacement, active fuel management, and multiple camshaft systems.

Figure 2:
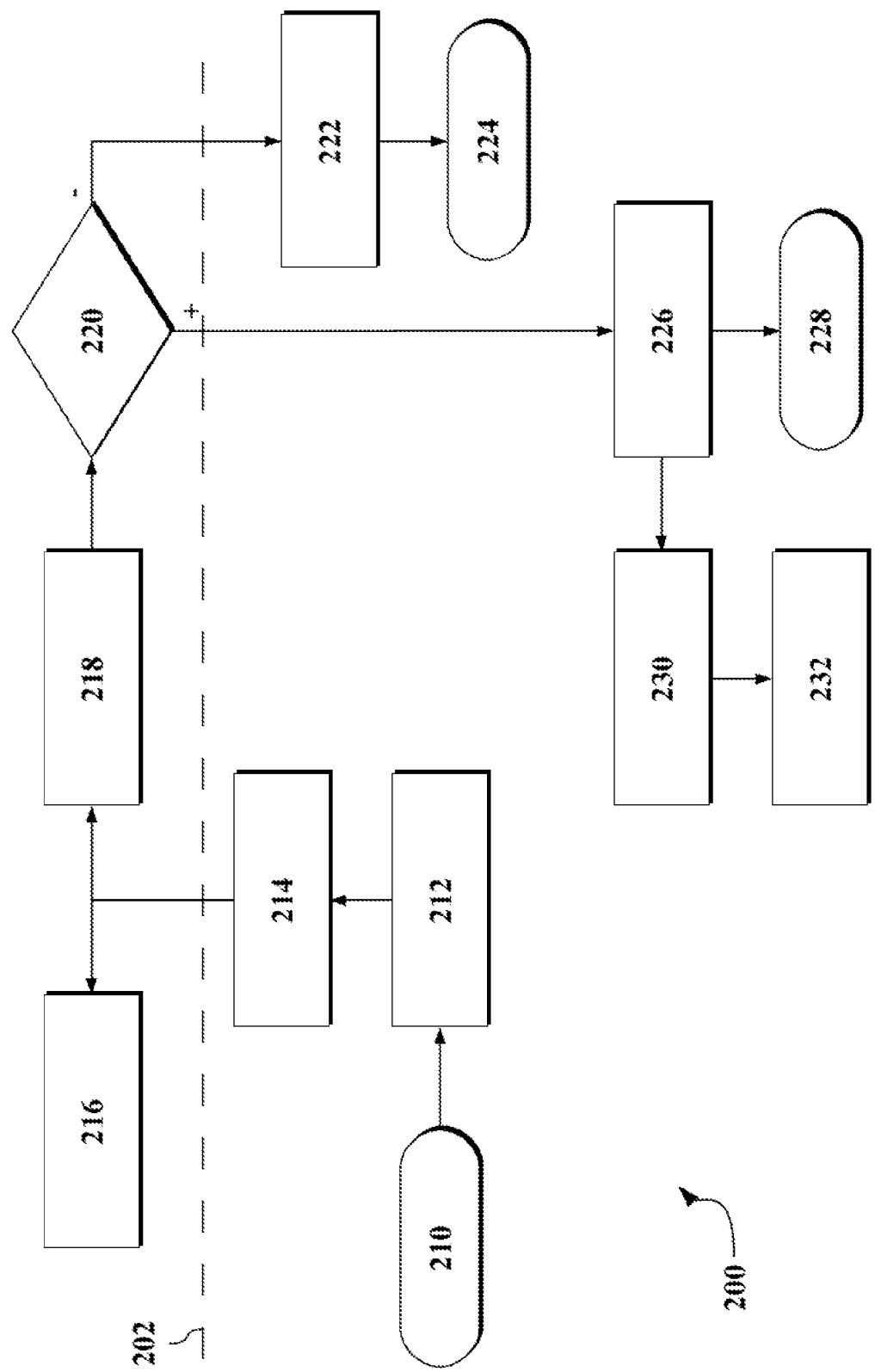
FIG. 2 is a schematic flow chart of an algorithm or method for controlling an internal combustion engine of a hybrid powertrain, such as that shown in FIG. 1.

Referring now to FIG. 2, and with continued reference to FIG. 1, there is shown a schematic flowchart of an algorithm or method 200 for controlling the engine 110 to selectively supply vacuum for the vacuum requester 130. The method 200 may be used to determine whether vacuum capacity is available, such that the engine 110 may be operated at less than maximum available torque capacity, and whether the vacuum should be used or whether the vacuum request should be overridden in favor of producing more torque.

Generally, steps shown below a line 202 of FIG. 2 are part of the operations of the ECM 112, and steps shown above the line 202 of FIG. 2 are part of the operations of the HCP 116. However, the relative location of steps above or below the line 202 is not limiting. Furthermore, a single controller may execute some or all of the functions of the ECM 112, the HCP 116, or both. As used in FIG. 2, any decision steps answered positively (as a yes) follow the path labeled with a "+" sign (the mathematical plus or addition operator). Similarly, decision steps answered negatively (as a no) follow the path labeled with a "−" sign (the mathematical minus or subtraction operator).

Step 210: Request Vacuum.

The method 200 begins when the vacuum requestor 130 requests a pressure differential (vacuum) between the air intake 120 and the manifold 124. As discussed herein, the many functions of the engine 110 or other components of the hybrid powertrain 100 may require vacuum. By requesting a pressure differential between a first intake point (the air intake 120) and a second intake point (the manifold 124), step 210 signals that the throttle 122 may need to be actuated such that engine 110 will temporarily operate at reduced capacity.

Step 212: Calculate Actual Torque Capacity.

The method 200 includes calculating an actual torque capacity. In order to do this, the method converts the TIAP pressure measured by the intake sensor 126 to the (maximum) actual torque capacity by applying a pressure model, which converts air pressure to torque, or applying an air mass model, which converts air mass flow to torque. The pressure model determines torque capacity of the engine 110 as a function of the available air for combustion, and determines the available air from pressure readings.

The engine 110 is actually drawing air from the manifold 124. However, the actual torque capacity occurs when the pressure is substantially equal at the first intake point (the air intake 120) and at the second intake point (the manifold 124). Therefore, step 212 calculates torque by using the TIAP (measured by the intake sensor 126) as the input to the pressure model instead of the manifold pressure (measured by the MAP sensor 128). Using the TIAP with the pressure model ensures that step 212 is calculating the actual torque capacity while assuming that the throttle 122 will be fully opened, such that the pressure in the manifold 124 equals the pressure at the air intake 120 and the maximum amount of available air is entering the engine 110.

Step 214: Calculate Desired Torque Capacity.

The method 200 includes calculating a desired torque capacity. The pressure model determines the desired torque capacity of the engine 110 by calculating the torque which would be produced during operation with pressure in the manifold 124 reduced to levels needed to supply vacuum to the vacuum requester 130. Operating at the desired torque capacity reduces the pressure at the second intake point (the manifold 124) relative to the pressure at the first intake point (the air intake 120), such that the pressure differential is created.

For illustrative purposes, an example of the determinations and calculations undertaken by the method 200 in steps 210-214 is contained herein. The values and units expressed herein are solely illustrative, do not limit the scope of the claimed invention, and may vary greatly from actual practice depending upon the size and type of engine 110.

Assume, for example and without limitation, that the vacuum requestor 130 requests 10 kilopascals (kPa) of vacuum at step 210. If the intake sensor 126 measures TIAP of approximately 100 kPa, in order to supply the 10 kPa of requested vacuum, the pressure within the manifold 124 needs to be at or below approximately 90 kPa. Step 212 will calculate the actual torque capacity—possibly from the pressure model—of the engine 110 operating with the full (saturated air flow) air input of 100 kPa. The actual torque capacity in these circumstances may be approximately 150 newton meters (Nm).

The method 200 will also calculate the desired torque capacity necessary to achieve operation of the engine 110 while using 90 kPa of reduced pressure (relative to the air intake 120) in the manifold 124. The pressure model may determine that the desired torque capacity in these circumstances is approximately 135 Nm. Therefore, in steps 210-214, the method 200 has determined that if the engine 110 is operated to produce approximately 135 Nm of torque (the desired torque capacity), the throttle 122 will restrict flow into the manifold 124 such that the vacuum requestor 130 will have approximately 10 kPa of vacuum with which to execute its functions.

Note that the ECM 112 is not directly measuring torque output or capacity of the engine 110, these are estimates based upon models. As long as it results in sufficiently accurate estimates, the ECM 112 and the method 200 may use any model or calculation to estimate the actual torque capacity and desired torque capacity. Furthermore, the method 200 may use multiple models or combinations of models. The method 200 then proceeds to determine which of the torque capacity estimates should be used, which may include sending the actual torque capacity and the desired torque capacity to the HCP 116.

Step 216: Determine Gear Ratio or Mode; Long-Term Optimization.

Once the final torque capacity has been determined by the ECM 112, the method 200 shown in FIG. 2 sends the final torque capacity to the HCP 116 for optimization of the hybrid powertrain 100 in light of the current and expected operating conditions of the hybrid vehicle, and preferably to do so in an efficient manner. One of the functions performed by the HCP 116 is to determine the gear ratio or transmission mode. This is referred to as a long-term optimization because the HCP 116 attempts to choose a gear ratio which will satisfy the operating requirements of the driver for more than an instantaneous or immediate time frame.

Step 218: Determine Engine Torque Request; Short-Term Optimization.

Another of the functions which may be performed by the HCP 116 is to determine an engine torque request for operation of the engine 110 which will allow the hybrid powertrain 100 to meet, generally, the instantaneous operating conditions requested by the driver. This is referred to as a short-term optimization because the HCP 116 and the driver may quickly alter the amount of torque requested of the engine 110 or the hybrid powertrain 100 as a whole. The HCP 116 calculates the engine torque request as a function of the actual torque capacity and the desired torque capacity sent by the ECM 112, and as a function of a powertrain torque request.

In a strong hybrid, such as a multi-mode EVT hybrid vehicle, the driver's pedal commands are converted into an axle torque request and the HCP 116 determines the combined torque from the engine 110 and the electric machine 114 that are most-likely to satisfy the driver and other requirements for the hybrid powertrain 100. Similarly, in a mild hybrid, such as a belt-alternator-starter vehicle, the HCP 116 determines a crankshaft torque request and then determines the combined torque from the engine 110 and the electric machine 114 that are most-likely to satisfy the crankshaft torque request. Either of the axle torque request or the crankshaft torque request may be referred to generally as the powertrain torque request, and represent the torque needs of the hybrid powertrain 100.

The powertrain torque request may come, in whole or part, from sources other than the driver. For example, and without limitation, cruise control or object avoidance systems may provide the powertrain torque request or alter the torque requested by the driver. Following short-term optimization, the engine torque request is sent back to the ECM 112 in order to control the engine 110 to the desired amount of torque.

If the HCP 116 ultimately determines that the engine 110 will be run at the reduced level of the desired torque capacity, lowering the overall torque capacity of the engine 110 will often drive the long term optimization at step 216 to select a transmission ratio that would increase the speed of engine 110. The speed increase for the engine 110 allows the HCP 116 to generally maintain a constant power output, because it takes a higher speed at a lower torque to output the same power from the hybrid powertrain 100.

Step 220: Desired Torque Capacity greater than Engine Torque Request?

Depending upon the configuration of the hybrid powertrain 100, and the relative capabilities of the prime movers (the engine 110 and the electric machines 114), the tendency of the HCP 116 may be to operate the engine 110 at the actual torque capacity in order to satisfy the powertrain torque request. Steps 218 and 220 include monitoring the powertrain torque request and comparing the powertrain torque request to the actual torque capacity and the desired torque capacity. The HCP 116 incorporates the vacuum request (and the relatively lower desired torque capacity) into its short-term optimization in order to defeat the tendency to operate the engine 110 at the greatest available torque level (the actual torque capacity) for fuel efficiency purposes. Steps 218 and 220 may be combined into a single step or process within the HCP 116.

The HCP 116 determines the engine torque request with the goals of: first, satisfying the satisfying the powertrain torque request (which incorporates the driver's torque request), and second, satisfying the vacuum request by operating the engine 110 at the desired torque request. The method 200 may therefore include operating the engine 110 at the desired torque capacity if the powertrain torque request can be met with the desired torque capacity, or operating the engine 110 at a torque output between the desired torque capacity and the actual torque capacity if the powertrain torque request cannot be met with the desired torque capacity.

Steps 218 and 220 may include first determining the engine torque request which best suites the powertrain torque request, and then comparing that value to the desired torque capacity in order to determine how to operate the engine 110. Alternatively, the method 200 may initially determine the engine torque request based upon the ability to meet the desired torque capacity in light of the powertrain torque request, such that the comparison step of 220 is incorporated into the determination of the engine torque request.

After the HCP 116 has determined the engine torque request, including whether the desired torque request can be met, the method 200 may include sending the engine torque request from the HCP 116 to the ECM 112. As shown in FIG. 2, if the desired torque capacity cannot be met while satisfying other requirements for the hybrid powertrain 100, the method 200 proceeds from step 220 to step 222.

Step 222: Control Throttle to Saturation.

Generally, if the method 200 determines that the engine 110 should not be operated at the desired torque capacity, the HCP 116 will have chosen the actual torque capacity as the engine torque request. In order to satisfy the engine torque request at the actual torque capacity, the ECM 112 will control the throttle 122 to remove vacuum, such that the throttle 122 is allowing saturated airflow from the air intake 120 into the manifold 124. This may also be referred to as unrestricted flow, least-restricted flow, or wide-open throttle 122. The additional torque actuators 132 will also be controlled to allow the engine 110 to operate at the actual torque capacity.

In order to determine how to operate the throttle 122 to meet the engine torque request, from the HCP 116, the method 200 converts the engine torque request back to a pressure value for the manifold 124. The method 200 calculates required manifold pressure as a function of the engine torque request from the HCP 116. The manifold pressure request will then be used to control the throttle 122 and the additional torque actuators 132.

Calculating the manifold pressure request may include an inverse pressure model, which is the inverse function of the pressure model used to determine the actual torque capacity in step 212. Illustrating with the example from above, the pressure model used a pressure value of 100 kPa as the input and determined that the actual torque capacity was 150 Nm as the output. The inverse pressure model will take the engine torque request (which is equal to the actual torque capacity) of 150 Nm as the input and determine that the required pressure in the manifold 124 should be 100 kPa as the output. The ECM 112 will then actuate the throttle 122 to achieve 100 kPa in the manifold 124.

Step 224: No Vacuum.

The method 200 then terminates with the engine 110 operating at the actual torque capacity and with there being no pressure differential between the air intake 120 and the manifold 124. Therefore, there is no vacuum for use by the vacuum requester 130. Alternatively, the HCP 116 may have determined to operate the engine 110 at a value between the desired torque capacity and the actual torque capacity. In such an instance, there will be insufficient vacuum available for the vacuum requester 130, and the additional torque actuators 132 (such as the cam phasers) may adjust the combustion characteristics of the engine 110 until the small amount of vacuum is removed.

Step 226: Control Throttle to Restrict Flow.

As shown in FIG. 2, if the desired torque capacity can be met while satisfying other requirements for the hybrid powertrain 100, such as the powertrain torque request, the method 200 proceeds from step 220 to step 226. In order to satisfy the engine torque request at the desired torque capacity, the ECM 112 will control the throttle 122 to supply the requested vacuum, such that the throttle 122 will restrict airflow from the air intake 120 into the manifold 124.

In order to determine how to operate the throttle 122 to meet the engine torque request from the HCP 116, the method 200 converts the desired torque capacity back to a pressure value for the manifold 124. The method 200 calculates required manifold pressure as a function of the desired torque capacity. The manifold pressure request will then be used to control the throttle 122 and the additional torque actuators 132.

Calculating the manifold pressure request may again include the inverse pressure model. The inverse pressure model will take the engine torque request (which is equal to the desired torque capacity) of 135 Nm as the input and determine that the required pressure in the manifold 124 should be 90 kPa as the output. The ECM 112 will then actuate the throttle 122 to restrict flow from the air intake 120 (which is at 100 kPa) and achieve only 90 kPa in the manifold 124.

Step 228: Vacuum.

The method 200 may then terminate with the engine 110 operating at the desired torque capacity and supplying a sufficient pressure differential between the air intake 120 and the manifold 124. Therefore, the vacuum requester 130 may use the vacuum to undertake whichever functions or components required vacuum at step 210.

Furthermore, unlike operation without vacuum, the method 200 may take other steps to ensure that the additional torque actuators 132 do not counteract vacuum request by removing the pressure differential between the air intake 120 and the manifold 124.

In some configurations of the method 200, steps 210 and 212 may include monitoring a passage of time since the vacuum was requested. If the vacuum request goes unmet or unsatisfied for a substantial period of time, the actual torque capacity may be recalculated to be equal to the desired torque capacity. In such configurations, steps 218 and 220 would have no choice but to select an operating range for the engine 110 equal to the desired torque capacity. Therefore, if the method 200 has run numerous iterations and always terminates at step 224 without drawing any vacuum between the air intake 120 and the manifold 124, this modification will force the engine 110 to operate at the desired torque capacity to supply the pressure differential to the vacuum requester 130.

Alternatively, the value of the pressure differential could be measured, and if the pressure differential remains below a target value for an extended time, the method 200 may recalculate or reset the actual torque capacity to the desired torque capacity. Such a configuration may be useful when the vacuum requester 130 is a component or function which may damage the hybrid powertrain 100 or the engine 110 if the vacuum is not supplied and the function carried out.

Step 230: Schedule Additional Torque Actuators.

At step 230, the additional torque actuators 132 will again be controlled as if the engine 110 were operating at the actual torque capacity, even though it is operating at the reduced level of the desired torque capacity. For example, the cam phasers will be scheduled as if the engine 110 is operating at the actual torque capacity. If possible, these schedules will be fixed, such that the additional torque actuators 132 are not free to adjust combustion characteristics (or other characteristics of the engine 110) to remove the vacuum.

Step 232: Arbitrate Vacuum Request.

Before fixing the schedules for the additional torque actuators 132, the method 200 arbitrates the vacuum request against other requests of the additional torque actuators 132. If the vacuum request can be met without defeating constraints placed upon the additional torque actuators 132 (or other components of the hybrid powertrain 100), the method 200 will fix the schedules of the additional torque actuators 132 (at maximum values) and allow the engine 110 to operate with vacuum for the vacuum requester 130. However, the method 200 may determine that the additional torque actuators 132 cannot be fixed or locked, and may allow the additional torque actuators 132 to remove the vacuum.

The method 200 may further include a learning system or function. After the engine 110 begins operating at the desired torque capacity and producing vacuum at step 228, the method 200 may apply learning to ensure that the estimates of the desired torque capacity are sufficient to provide the requested amount of vacuum. For illustrative purposes, continuing the example from above, if the engine 110 is in steady-state operation at the desired torque capacity of 135 Nm (which is actually an estimated value), the method 200 may be monitoring the pressure of the manifold 124 with the MAP sensor 128. If the manifold pressure is 95 kPa, there would only be 5 kPa of pressure differential for the vacuum requester 130, which is only half of the pressure differential requested. Therefore, by applying either learning or closed-loop adjustment, the desired torque capacity may be reduced so that the engine 110 is requested to operate at lower torque and the throttle 122 further restricts air flow into the manifold 124, reducing the manifold pressure and increasing the amount of the pressure differential.

For illustrative purposes, the method 200 is described with reference to many of the elements and components shown and described in relation to FIG. 1. However, other components may be used to practice the method 200 and the invention defined in the appended claims. The exact order of the steps of the algorithm or method 200 shown in FIG. 2 is not required. Steps may be reordered, steps may be omitted, and additional steps may be included.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for selectively creating vacuum in a hybrid powertrain controlled by a hybrid control processor and having an engine controlled by an engine control module, the method comprising:
   requesting a pressure differential between a first intake point and a second intake point, wherein the first intake point and the second intake point are separated by a throttle;
   calculating an actual torque capacity for the engine, wherein the actual torque capacity occurs when pressure is substantially equal at the first intake point and at the second intake point;
   calculating a desired torque capacity for the engine, wherein the desired torque capacity reduces the pressure at the second intake point relative to the pressure at the first intake point, such that the requested pressure differential is created; and
   operating the engine at one of the desired torque capacity and the actual torque capacity.

2. The method of claim 1, further comprising:
   monitoring a powertrain torque request;
   operating the engine at the desired torque capacity if the powertrain torque request can be met with the engine torque operating at or below the desired torque capacity; and
   operating the engine between the desired torque capacity and the actual torque capacity if the powertrain torque request cannot be met with the engine torque operating at the desired torque capacity.

3. The method of claim 2, further comprising:
   sending the actual torque capacity and the desired torque capacity to the hybrid control processor;
   comparing the powertrain torque request to the actual torque capacity and the desired torque capacity with the hybrid control processor;
   determining an engine torque request with the hybrid control processor, wherein determining the engine torque request, includes:
      operating the engine at the desired torque capacity if the powertrain torque request can be met with the desired torque capacity, and
      operating the engine between the desired torque capacity and the actual torque capacity if the powertrain torque request cannot be met with the desired torque capacity; and
   sending the engine torque request from the hybrid control processor to the engine control module.

4. The method of claim 3, further comprising:
   determining a cam phaser schedule; and
   fixing the cam phaser schedule during operation of the engine at the desired torque capacity.

5. The method of claim 4, wherein the pressure differential is requested for one of a canister purge, an exhaust gas recirculation, a brake booster, an evaporative emissions system, and a positive crankcase ventilation.

6. The method of claim 5, further comprising:
   monitoring a passage of time following requesting the pressure differential; and
   if the passage of time is greater than a constraint value, and the engine has not been operated at the desired torque capacity, setting the actual torque capacity equal to the desired torque capacity, such that the engine begins operating at the desired torque capacity.

7. The method of claim 6, further comprising:
   measuring a resulting pressure differential while the engine is operating at the desired torque capacity;
   comparing the resulting pressure differential to the requested pressure differential;
   if the resulting pressure differential is different from the requested pressure differential, recalculating the desired torque capacity for the engine; and
   operating the engine at the recalculated desired torque capacity, such that the requested pressure differential occurs between the first intake point and the second intake point.

8. The method of claim 7, wherein the first intake point is an air intake for the engine, and the second intake point is a manifold for the engine.

9. A method for selectively creating vacuum in a hybrid powertrain controlled by a hybrid control processor and having an engine controlled by an engine control module, the method comprising:
   requesting a pressure differential between a first intake point and a second intake point, wherein the first intake point is an air intake for the engine, the second intake point is a manifold for the engine, and the first intake point and the second intake point are separated by a throttle;
   monitoring a powertrain torque request;
   calculating an actual torque capacity for the engine, wherein the actual torque capacity occurs when pressure is substantially equal at the first intake point and at the second intake point;
   calculating a desired torque capacity for the engine, wherein the desired torque capacity reduces the pressure at the second intake point relative to the pressure at the first intake point, such that the requested pressure differential is created;
   sending the actual torque capacity and the desired torque capacity to the hybrid control processor;
   comparing the powertrain torque request to the actual torque capacity and the desired torque capacity with the hybrid control processor;
   determining an engine torque request with the hybrid control processor, wherein determining the engine torque request, includes:

operating the engine at the desired torque capacity if the powertrain torque request can be met with the desired torque capacity, and operating the engine between the desired torque capacity and the actual torque capacity if the powertrain torque request cannot be met with the desired torque capacity; and sending the engine torque request from the hybrid control processor to the engine control module.

10. The method of claim 9, further comprising:

determining a cam phaser schedule; and fixing the cam phaser schedule during operation of the engine at the desired torque capacity.

11. The method of claim 10, further comprising:

monitoring a passage of time following requesting the pressure differential; and if the passage of time is greater than a constraint value, and the engine has not been operated at the desired torque capacity, setting the actual torque capacity equal to the desired torque capacity, such that the engine begins operating at the desired torque capacity.

* * * * *